United States Patent Office 3,644,570
Patented Feb. 22, 1972

3,644,570
PROCESS FOR THE PREPARATION OF RUBBER MODIFIED NOVOLAK RESINS
Kerry David Jeffreys, Rhiwbina, Cardiff, Wales, assignor to BP Chemicals (U.K.) Limited, London, England
No Drawing. Filed Sept. 24, 1969, Ser. No. 860,808
Claims priority, application Great Britain, Oct. 1, 1968, 46,440/68
Int. Cl. C08d 9/10; C08g 37/20, 51/24
U.S. Cl. 260—845                                    7 Claims

ABSTRACT OF THE DISCLOSURE

Rubber modified phenolic resole and novolak resins are prepared by reacting the phenol and aldehyde under the appropriate reaction conditions in the presence of a latex of a polychloroprene rubber.

---

This invention relates to a process for the preparation of modified resins, more particularly to the preparation of rubber modified novolak resins.

Rubber modified resole resins have been prepared by adding rubber latices to resole reaction mixtures, resole resins being prepared by the reaction of an aldehyde with a phenol under alkaline conditions.

Novolak resins are usually prepared by reacting an aldehyde and a phenol under acid conditions and since rubber latices are known to be unstable under acid conditions, rubber modified novolak resins have not been prepared by the method used for resole resins. They have hitherto been prepared by the laborious and time-consuming steps of rolling, compounding or milling together solid rubber with the novolak resin. Under these conditions it is difficult to obtain a resin having the rubber uniformly dispersed therein.

Rubber modified novolak resins have also been prepared by dissolving both the resin and the rubber in a mutual solvent and evaporating the solvent in a subsequent step. This method suffers from the disadvantage of being time-consuming and relatively expensive. It is time-consuming because the rubber tends to dissolve slowly in the solvent and it is expensive by virtue of the solvent used and lost throughout the process.

We have now surprisingly found that by using certain rubber latices and a novolak reaction mixture, satisfactory rubber modified resins are obtained by a process which is considerably faster and more economic than those referred to above.

The present invention is a process for the preparation of rubber modified novolak resin which comprises allowing an aldehyde and a molar excess of phenol to react under novolak reaction conditions in the presence of a latex of a polychloroprene rubber.

Suitable polychloroprene latices are dispersions of polymerised 2-chloro-1,3-butadiene in water containing dispersing and stabilising agents.

The phenol may be one or a mixture of the phenols commonly used in the production of novolak resins, for example a phenol, a cresol, a xylenol or a naphthol. Phenol ($C_6H_5OH$) is the preferred phenol.

The aldehyde may be one or a mixture of the aldehydes known to give satisfactory novolak resins, e.g. formaldehyde, acetaldehyde and benzaldehyde. Formaldehyde is preferred and it is conveniently used in the form of paraform or an aqueous formaldehyde solution, e.g. Formalin.

The reaction conditions employed are those known for the production of novolak resins, that is to say the phenol should be present in molar excess, for example 0.1 to 50% molar excess, the pH at least during the initial phenol/aldehyde reaction, should be less than 7, for example 6.9 to 1 and the temperature should preferably lie in the range 50° to 200° C.

For example, a typical novolak is prepared by refluxing phenol with Formalin in a molar ratio of 1 mole of phenol for every 0.9 mole of available formaldehyde and in the presence of about 1–5% by weight of an acid catalyst, e.g. aqueous oxalic acid, the reflux temperature being about 95°–100° C. Examples of alternative acids which may be conveniently used as sulphuric, hydrochloric, phosphoric, nitric, formic and acetic acid.

In the process of the present invention the rubber latex may be added before or during reaction of the aldehyde with the phenol. It is preferable, however, to add the rubber latex during the phenol/aldehyde reaction and towards the end of the reaction, e.g. when there is only about 2% by weight of unreacted formaldehyde present in the reaction mixture. Furthermore, it may be found advantageous to change the pH of the phenol/aldehyde reaction mixture to the alkaline side once the free formaldehyde content is less than 2% by weight and before addition of the latex. It may also be found advantageous to add more stabilisers to the latex prior to the addition of the latex to the phenol/aldehyde reaction mixture. When the reaction is complete, the liquid phase of the latex can then be removed by any convenient means, e.g. by distillation under reduced pressure.

The rubber modified novolak resins produced by the process of the present invention preferably contain 1.0 to 30% by weight of polychloroprene rubber. This corresponds to adding to the novolak reaction mixture about 5 to 150 parts dry weight of rubber as latex for every 100 parts of formaldehyde used in the process of the present invention.

The process of the present invention yields, after removal of volatile matter, solid novolak resins in which the rubber dispersion is particularly uniform, the resin being substantially free from rubber agglomerations.

The advantages of the present process over the prior art processes are:

(i) Saving of time

The process of the invention yields a rubber modified novolak resin in substantially the same time as it takes to prepare an unmodified novolak resin.

(ii) Uniform dispersion of the rubber in the resin

The uniformity of dispersion is readily apparent from the appearance of the modified resin.

(iii) Resins have good "hot flow" properties

The ability to flow when heated under moulding conditions is much better for the resins of the present invention compared with those rubber modified resins obtained from a milling/compounding technique.

(iv) Convenience

The process is simple and requires no specialised equipment.

The rubber modified resins produced by the process of the present invention may be mixed with the usual curing agents for phenolic resins, for example hexamethylene tetramine or paraform to give, on heating, thermosetting resins. Curing agents for the rubber, e.g. zinc oxide, sulphur and accelerators may also be added to the rubber modified resin if desired.

Conventional inorganic or organic fillers may be added to the rubber modified resins to produce moulding compositions.

The rubber modified resins are more plasticised, more flexible and/or shock resistant than unmodified novolak resins and are particularly useful for example as binder resins in the manufacture of friction elements such as brake linings and clutch facings.

The invention is further illustrated by the examples that follow:

EXAMPLE 1

The following were charged to a flask fitted with a reflux condenser, thermometer and stirrer.

Phenol (1880 grams), Formalin 37% (1460 grams), oxalic acid (10 grams dissolved in 40 grams of water). The mixture was heated to reflux and was maintained at reflux until the free formaldehyde content (as determined by hydroxylamine hydrochloride) was less than 2% (2½ hours). Cooling was applied and when the mix was at 90° C., Neoprene latex 950[1] (376 grams) was run into the batch in a steady stream over 10 minutes. The mixture was distilled under reduced pressure (20 mms. mercury) to a final resin temperature of 145° C. to dehydrate the resin. The resin was then poured and it hardened on cooling to a solid (2200 grams) of softening point (ring and ball) of 98° C. The resin could be cured to an insoluble, infusible form by heating at 150° C. with 10% addition of hexamine.

EXAMPLE 2

The following ingredients were charged to a flask fitted with a reflux condenser, thermometer and stirrer.

Phenol (1880 grams), Formalin (1460 grams), oxalic acid (10 grams dissolved in 40 grams of water). The mix was refluxed until it became turbid and then for a further 70 minutes. It was cooled to 60° C. and Neoprene 842A[1] (460 grams) was added in a steady stream over 10 minutes so that the latex was evenly dispersed in the mix. The mixture was distilled under reduced pressure (25 mms. mercury) to a final resin temperature of 145° C. The solid resin (2231 grams) had a softening point (ring and ball) of 103° C. and could be hardened with hexamine.

[1] Neoprene 842A and Neoprene 950 are latices manufactured by E.I. du Pont de Nemours and Company, and contain about 50% dry weight of rubber. Latex 842A is described as a general purpose fast curing latex emulsified with sodium rosinate, whilst Latex 950 is described as a special purpose cationic type having alkylated tolyl methyl trimethyl ammonium chloride as the emulsifying agent.

I claim:
1. A process for the preparation of a rubber-modified novolak resin which comprises allowing an aldehyde and a 0.1 to 50% molar excess of a phenol to initially react at a pH less than 7 and, prior to the consumption by the reaction of all the aldehyde, adding a quantity of a latex of polychloroprene rubber sufficient to provide from 1.0 to 30% by weight of polychloroprene rubber in the rubber-modified novolak resin.

2. A process for the preparation of a rubber-modified novolak resin as claimed in claim 1 wherein the polychloroprene rubber latex is a dispersion of polymerised 2-chloro-1,3-butadiene in water.

3. A process for the preparation of a rubber-modified novolak resin as claimed in claim 1 wherein the phenol is phenol ($C_6H_5OH$).

4. A process for the preparation of a rubber-modified novolak resin as claimed in claim 1 wherein the aldehyde is formaldehyde.

5. A process for the preparation of a rubber-modified novolak resin as claimed in claim 1 wherein the polychloroprene rubber latex is added when about 2% of the aldehyde is unreacted.

6. A process for the preparation of a rubber-modified novolak resin as claimed in claim 1 wherein the aldehyde employed is formaldehyde and 5–150 parts by dry weight of polychloroprene rubber are used for every 100 parts by weight of formaldehyde.

7. A process for the preparation of a rubber-modified novolak resin as claimed in claim 1 wherein the resulting resin is mixed with a curing agent capable of converting the resin into a thermoset product.

References Cited

UNITED STATES PATENTS

| | | | |
|---|---|---|---|
| 2,270,959 | 1/1942 | Murke et al. | 260—845 |
| 2,481,879 | 9/1949 | Ross | 260—845 |
| 2,550,143 | 4/1951 | Eger | 260—845 |

JOHN C. BLEUTGE, Primary Examiner

U.S. Cl. X.R.

260—29.3